US006986532B1

(12) United States Patent
King

(10) Patent No.: US 6,986,532 B1
(45) Date of Patent: Jan. 17, 2006

(54) SADDLE TEE AND TAP FOR IRRIGATION LINES

(75) Inventor: Thomas A. King, Ballwin, MO (US)

(73) Assignee: Tom King Harmony Products, Inc., St. Louis, MO (US)

(*) Notice: Subject to any disclaimer, the term of this patent is extended or adjusted under 35 U.S.C. 154(b) by 104 days.

(21) Appl. No.: 10/138,715

(22) Filed: May 3, 2002

(51) Int. Cl.
*F16L 41/03* (2006.01)

(52) U.S. Cl. ...................................... 285/197; 137/318

(58) Field of Classification Search ................ 285/197, 285/198, 199; 137/318
See application file for complete search history.

(56) References Cited

U.S. PATENT DOCUMENTS

| | | | | |
|---|---|---|---|---|
| 1,928,316 | A | 9/1933 | Muto | |
| 2,332,350 | A * | 10/1943 | Scritchfield | 285/197 |
| 2,839,075 | A | 6/1958 | Mueller | |
| 3,162,211 | A | 12/1964 | Barusch | |
| 3,258,822 | A | 7/1966 | Schlesch et al. | |
| 3,280,846 | A | 10/1966 | Anderson et al. | |
| 3,343,724 | A | 9/1967 | Malpas | |
| 3,432,188 | A | 3/1969 | Turner | |
| 3,460,715 | A | 8/1969 | Lane et al. | |
| 3,460,721 | A | 8/1969 | Hamel et al. | |
| 3,471,176 | A | 10/1969 | Gilchrist | |
| 3,489,441 | A | 1/1970 | Malcolm | |
| 3,825,286 | A * | 7/1974 | Henry, III | 285/197 |
| 3,891,150 | A | 6/1975 | Hoff et al. | |
| 3,999,785 | A | 12/1976 | Blakeley | |
| 4,076,038 | A | 2/1978 | Wynne | |
| 4,158,461 | A | 6/1979 | Francis | |
| 4,239,265 | A | 12/1980 | King, Sr. | |
| 4,258,742 | A | 3/1981 | Louthan et al. | |
| 4,373,235 | A | 2/1983 | Korgaonkar | |
| 4,730,636 | A | 3/1988 | Volgstadt et al. | |
| 4,789,189 | A | 12/1988 | Robertson | |
| 5,054,820 | A * | 10/1991 | Lesquir et al. | 285/197 |
| 5,095,564 | A * | 3/1992 | Kruger | 285/197 |
| 5,105,844 | A * | 4/1992 | King, Sr. | 285/197 |
| 5,640,991 | A | 6/1997 | King | |
| 5,694,972 | A * | 12/1997 | King | 285/197 |
| 5,964,241 | A | 10/1999 | King | |
| 6,216,723 | B1 * | 4/2001 | King | 285/197 |
| 6,357,472 | B1 * | 3/2002 | King | 285/197 |

OTHER PUBLICATIONS

Recommendation 12 (WTDC-02), The World Telecommunication development Conference (Istanbul 2002).
The Cellular-Emergency Alert Services Association Policy Statement, Aug. 5, 2002, may be seen at www.ceasa.us/news.htm.
Cellular Emergency Alert Services Association, Feb. 21, 2003, CellAlert Services Corporate Structure, may be seen at www.ceasa.us/news.htm.

(Continued)

*Primary Examiner*—David Bochna
(74) *Attorney, Agent, or Firm*—Harness, Dickey & Pierce, P.L.C.

(57) ABSTRACT

A saddle tee and tap combination for making a fluid connection with an irrigation line in an irrigation system. The saddle tee includes a base having a passage therethrough, and a clamp thereon for engaging an irrigation line. The clamp holds the irrigation line in alignment with the passage, and compresses the irrigation line into an generally oval cross-section elongated in the direction of the axis of the passageway. The tap has a tip with a pointed end adapted to be inserted into the passageway so that the pointed end penetrates the wall of the irrigation line engaged in the clamp, in the direction of the elongation of the cross section.

8 Claims, 4 Drawing Sheets

OTHER PUBLICATIONS

News From Senator John Edwards, North Carolina, Apr. 3, 2003, Senate Okays Edwards Emergency Warning Bill, may be seen at www.ceasa.us/news.htm.

Canadians want Emergency-Location Services, by Dave Ebner, Apr. 11, 2003, may be seen at www.ceasa.us/news.htm.

Texas message warn of 'killer flu' hot spots, Apr. 20, 2003, may be seen at www.ceasa.us/ews.htm.

British Parliament Debates CellAlert Service for the UK, May 1, 2003, may be seen at www.ceasa.us/news.htm.

The Wall Street Journal Oniline, Local Governments Look to Cellphone-Based Alerts, Carl Bialik, Jun. 12, 2003, may be seen at www.ceasa.us/news.htm.

RCR, Cell-Broadcast Service Gets Second Look, Jeffrey Silva, Nov. 10, 2003, may be seen at www.ceasa.us/news.htm.

* cited by examiner

SADDLE TEE AND TAP FOR IRRIGATION LINES

BACKGROUND OF THE INVENTION

This invention relates generally to a connector for an irrigation system and, in particular, to an improved saddle tee and tap for making connections with irrigation lines in an irrigation system.

Various types of connectors are used to make fluid connections with irrigation lines in an irrigation system. One such connector is a saddle tee, which can be used to make a connection anywhere along the length of the line, rather than just at one of the ends. Saddle tees allow taps to be inserted into the irrigation line, for example to connect a branch line to a main line, or to connect a sprinkler head or other device to a line.

Saddle tees were initially multi-piece devices secured onto an irrigation line with fasteners. Installation was difficult and time consuming, and often required tools. Examples of such saddle tees include those disclosed in U.S. Pat. Nos. 4,789,189, 5,095,564, and 5,104,844, incorporated herein by reference. Improvements have been made in saddle tees to reduce the number of parts, eliminate the need for separate fasteners, and make installation easier. The device disclosed in U.S. Pat. No. 5,694,972, incorporated herein by reference, is an example of such a device.

SUMMARY OF THE INVENTION

The saddle tee and tap of the present invention are adapted to be quickly and easily installed on a line in an irrigation system. Generally, the saddle tee of the present invention comprises a base having first and second ends, and a passageway therebetween, and a clamp on the second end for engaging the irrigation line generally in alignment with the passageway through the base. The clamp preferably compresses the irrigation line to elongate the cross-sectional profile in a direction aligned with the passageway in the base. The tap is adapted to be inserted through the passageway in the saddle tee, and into the irrigation line to make a fluid connection therewith. The tap has a tip that preferably terminates in a point for puncturing the irrigation line. There is a flange on the tip proximal to the point for engaging wall of the irrigation line.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
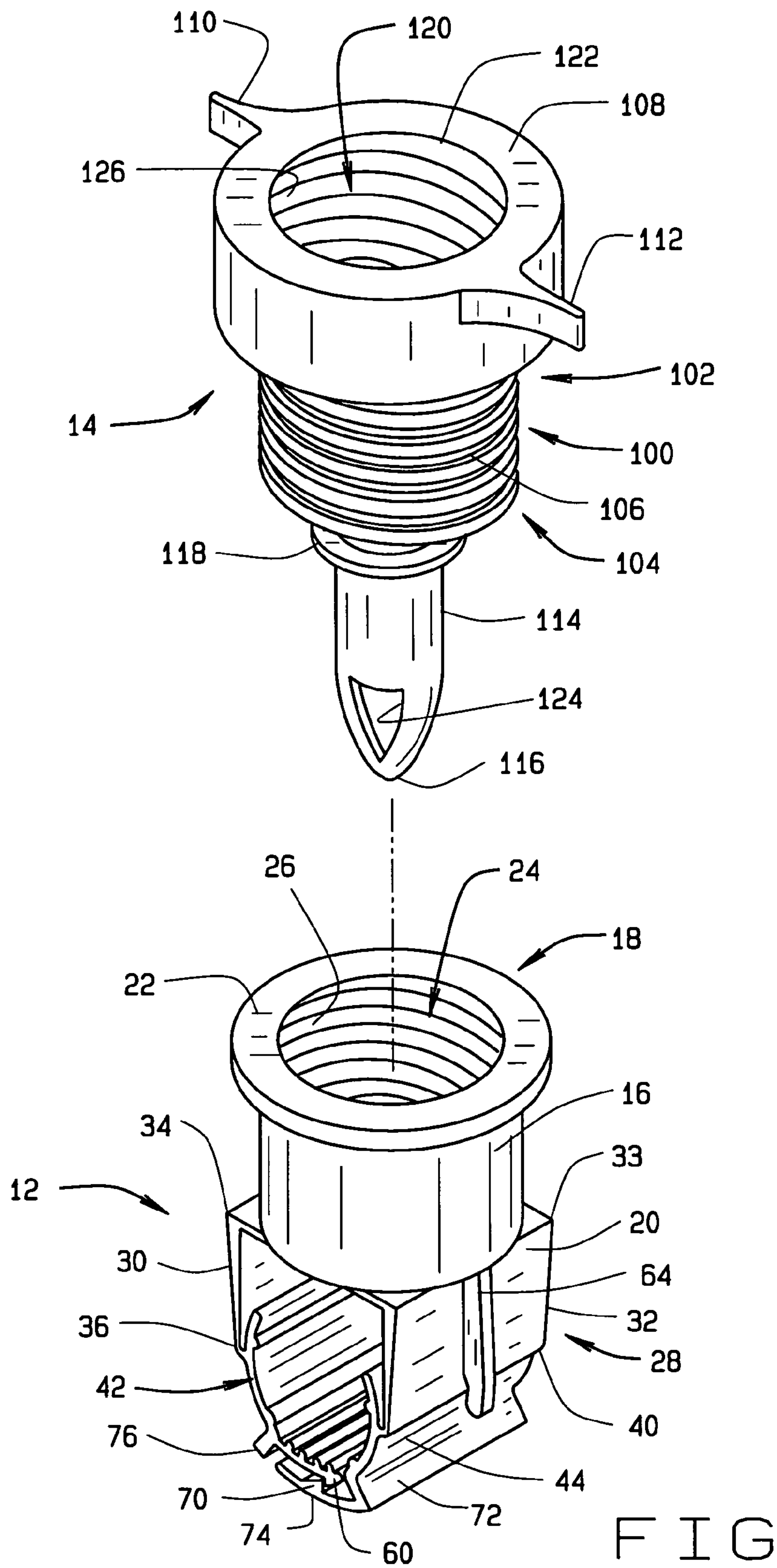
FIG. 1 is an exploded perspective view of a saddle tee and tap constructed according to the principles of the present invention.
Figure 2:
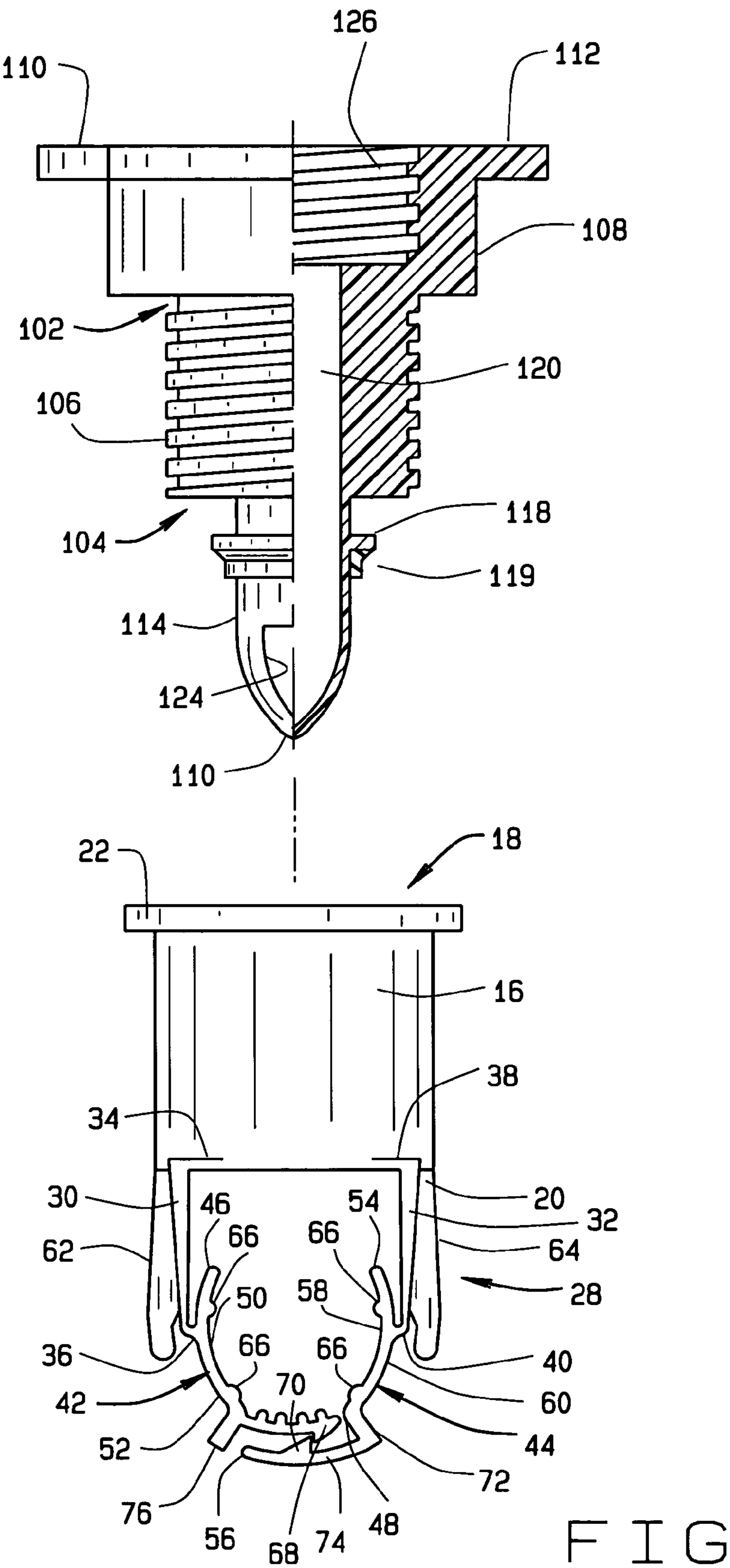
FIG. 2 is an exploded side elevation view of the saddle tee and tap, with the tap shown in partial cross section.

A saddle tee and tap constructed according to the principles of this invention are indicated generally as 12 and 14, respectively, in the Figures. As shown in FIGS. 1 and 2, the saddle tee 12 comprises a body 16, having first and second ends 18 and 20. A circular rim 22 projects from the body 16 adjacent the first end 18. A passage 24 extends through the body 16 from the first end 18 to the second end 20. The passage 24 preferably has internal threads 26.

There is a clamp 28 on the second end 20 of the body 16. The clamp 28 is adapted to engage and compress an irrigation line, holding the irrigation line in alignment with the passage 24. The clamp 28 comprises first and second arms 30 and 32 extending from the second end 20 of the body 16. The arm 30 tapers from its proximal end 34 adjacent to the body 16 to its distal end 36, and the arm 32 tapers from it proximal end 38 adjacent to the body to its distal end 40.

The clamp 28 further comprises jaws 42 and 44. Jaw 42 has a generally arcuate shape with first and second ends 46 and 48, and a concave inner surface 50 and a convex outer surface 52. Similarly, jaw 44 has a generally arcuate shape with first and second ends 54 and 56, and a concave inner surface 58, and an convex outer surface 60. The outer surface 52 of the first jaw 42 is hingedly mounted on the distal end 36 of the first arm 30, at a point intermediate the ends 46 and 48. Similarly, the outer surface 60 of the second jaw 44 is hingedly mounted on the distal end 40 of the second arm 32, at a point intermediate the ends 54 and 56. In this preferred embodiment the arms 30 and 32 are at least 0.5 inches long and are preferably between about 0.6 and 0.7 inches long. This length allows the irrigation line secured in the clamp to be spaced from the body 16, leaving the second end 20 of the body 16 open so that dirt and debris can fall through the passage 24, rather than accumulating in the passage and interfering with the insertion of tee 14 when used with either a ¾ inch i.d. line, or with a 1 inch i.d. line.

Ribs 62 and 64 are formed on the arms 30 and 32, and extend beyond the second ends of the arms to engage and stiffen the arms and limit the flexing of the jaws 42 and 44. One or more raised ridges 66 are formed on the inner surface 50 of first jaw 42 and on the inner surface 58 of second jaw 44. These ridges 66 engage the exterior of the irrigation line compressed between the jaws, helping to prevent the irrigation line from twisting in the clamp, and helping to ovalize the irrigation line in the clamp.

In the preferred embodiment the clamp 28 has a minor dimension L1 (shown in FIG. L1) between the jaws 42 and 44, and major dimension L2 (also shown in FIG. 7A) along the axis of the passageway 24 between the end 20 of the body 16, and the jaws. The major dimension L2 is preferably at least equal to, and preferably greater than, the outside diameter of the irrigation line L. The minor dimension L1 is preferably equal to, or less than, the outside diameter of the irrigation line. In a preferred embodiment the saddle tee 12 specifically adapted for a 1 inch i.d. (approximately 1.25 inch o.d) irrigation line L, the minor dimension L1 is about 1.2 inches and a major dimension L2 is about 1.3 inches. In a preferred embodiment of the saddle tee 12 specifically adapted for a ¾ inch i.d (approximately 0.9 inch o.d.) irrigation line L, the minor dimension L1 is about 0.8 inches and the minor dimension L2 is about 1.2 inches. The clamp 28 is preferably sized to compress the irrigation line L in one direction, and cause it to expand in another direction. This ovalization of the irrigation line helps make sure that the irrigation line is securely held in the clamp, and also helps ensure that the irrigation line has a sufficient dimension for effective penetration by a tap, which is important in smaller dimension irrigation lines such as ¾ i.d. inch lines, although less important in larger dimension lines, such as those greater than 1 inch i.d.

Figure 3:
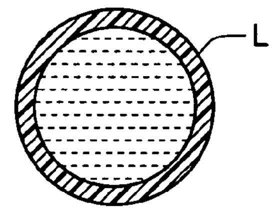
FIG. 3 is a transverse cross-sectional view an irrigation line.
Figure 6:
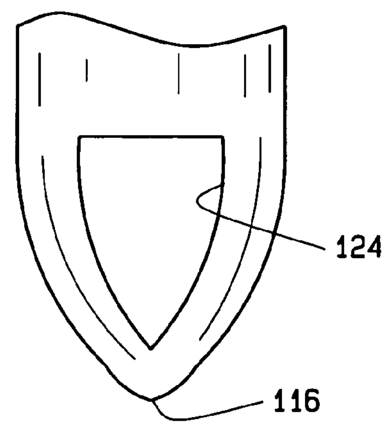
FIG. 6 is an enlarged partial side elevation view of the point on the distal end of the tap for piercing the irrigation line.
Figure 5:
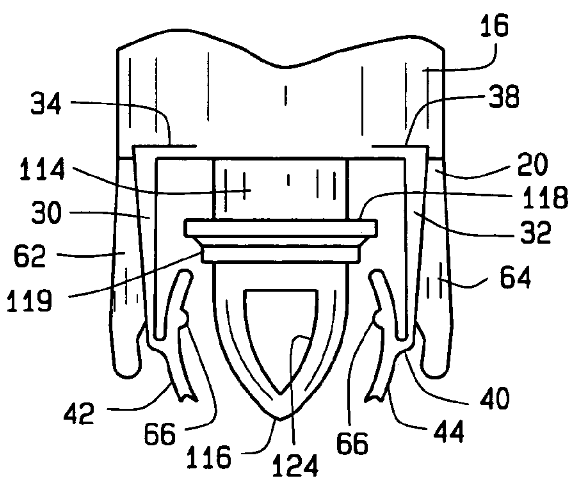
FIG. 5 is a partial side elevation view of the saddle tee shown with the tap partially extended.

The jaws 42 and 44 are adapted to be secured together to engage and compress an irrigation line L (FIGS. 3, 7A, and 7B) between them. The first jaw 42 has a raised ridge 68 on its outer surface 52, adjacent the second end 48. The second jaw 44 has a raised ridge 70 on its inner surface 58, adjacent the second end 56. There is a shoulder 72 in the second jaw 44 that forms an offset portion 74 adjacent the second end 56 so that second jaw can overlap the first jaw 42, and the ridge 68 on the first jaw engage the ridge 70 on the second jaw. A tab 76 projects radially outwardly from the first outer surface 54 of the first jaw. The shoulder 70 and the tab 76 form surfaces that can be engaged by hand or bypliers, or a tool specially adapted for the purpose to draw the jaws 42 and 44 together to compress an irrigation line L between them and engage each other.

The tap 14 comprises a generally cylindrical body 100, having first and second ends 102 and 104, and external threads 106. There is a generally cylindrical grip 108 at the first end 102 of the body 100. The grip 108 has wings 110 and 112 so that the tap can be grasped or engaged with a tool. There is a tubular tip 114 on the second end 104 of the body 100. The tip 114 preferably tapers to a point 116 at its distal end. For irrigation lines made of tougher material, such as polyvinylchloride, the radius of curvature of the point is greater than for relatively less tough materials such as polyethylene or polypropylene. As is know in the art, the end can be blunt, and still be able to weaken and pierce the wall of an irrigation line.

An annular flange 118 projects from the tip 114 intermediate its proximal and distal ends. A grommet 119 can be provided on the tip 114, adjacent the flange 118. Alternatively, instead of flange 118, a shoulder can be formed on the exterior of the tip for engaging the irrigation line and supporting the grommet. The grommet 119 preferably has a tapered exterior surface. The grommet 119 can be made from a resilient material to facilitate sealing the tip with the irrigation line. The flange 118 could be formed by the distal end of the threads 106, which can be constructed to compress the irrigation line L.

A passage 120 extends through the tap 14. A first end of the passage 120 opens at 122 in the grip 108, a second end of the passage 120 opens to windows 124 in the side of the tip 114, between the point 116 and the flange 118. A window 124 can also be provided in the distal end of the tip, particularly if a cutting member is provided on the tip.

The portion of the passage 120 adjacent the first end has threads 126, so that a threaded, fluid-tight connection can be made with the passage 120 in the tap 14. The tip 114 of the tap 14 is adapted to be inserted into an irrigation L to establish a fluid connection between the tap and the irrigation line. Fluid in the irrigation line can flow through the windows 124 into the passage 120 to another line or device connected to the threaded end of the passage 120. Of course, instead of threads 126, some other connecting means, such as bayonet fittings or other connecting scheme could be used.

Operation

In operation, the saddle tee 12 is secured on an irrigation line L at a point where it is desired to make a fluid connection with the irrigation line. The irrigation line is disposed between the hinged jaws 42 and 44. The user can grasp the jaws 42 and 44 with his or her hands to compress the irrigation line L between them and move the offset portion 74 of the second jaw 44 over the first jaw 42, until the ridges 68 and 70 engage each other and secure the jaws together. Alternatively, the user can use pliers or some other tool specifically adapted for that purpose can also be used to engage the shoulder 72 and the tab 76 to draw the jaws 42 and 44 together to secure them.

Figure 7A:
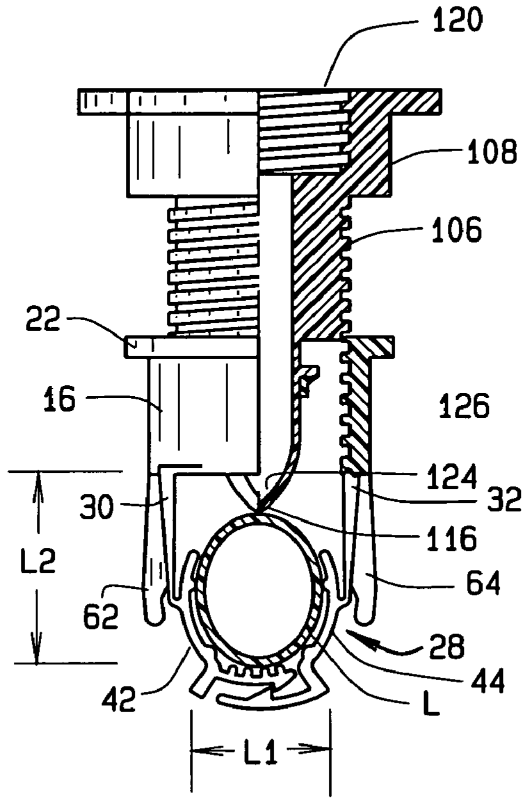
FIG. 7A is a transverse cross sectional view of the saddle tee and tap combination secured on an irrigation line, before the tap has made a fluid connection with the line.
Figure 7B:
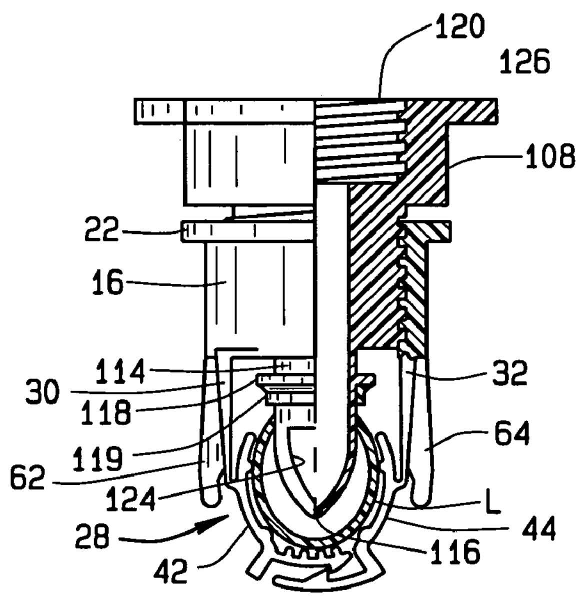
FIG. 7B is a transverse cross sectional view of the saddle tee and tap combination secured on an irrigation line, after the tap has been extended to make a fluid connection with the irrigation line.

As shown in FIGS. 7A and 7B, the jaws 42 and 44 preferably compress the irrigation line L between them so that the irrigation line assumes an oval cross sectional configuration, rather than its normal circular configuration (shown in FIG. 3), with a minor dimension between the jaws 42 and 44 (parallel to the minor dimension L1 of the clamp 28), and a major direction generally perpendicular thereto, and generally aligned with the passage 24 (parallel to the major dimension L2 of the claim 28). This is particularly advantageous in smaller diameter irrigation lines (i.e. those less than 1 inch i.d.). In larger diameter lines, the line is sufficiently large for the tap to penetrate without ovalization, although ovalization may be desirable to help ensure that the irrigation line is securely engaged in the clamp.

In the preferred embodiment the length of the portion of the jaws between their first ends and their hinged connection with their respective arms is about one third of the distance between the arms. Alternatively, in the preferred embodiment the length of the portion of the jaws between their first ends and their hinged connection with their respective arms is about 0.4 inches. This has a number of benefits, including allowing the first ends of the jaws to act as stops engaging the flange 118 on the tip 114 of a tap, as described below. The jaws 42 and 44 preferably substantially surround the irrigation line. In the preferred embodiment, the jaws preferably surround about ⅔ to about ¾ of the circumference of the irrigation line, leaving a portion of about ⅓ to about ¼ open to accommodate ovalization of the irrigation line.

Although not essential, the saddle tee is preferably configured so that pressing the saddle tee against the irrigation line with a force of more than about 30 pounds, draws the ends of the clamp together sufficiently to cause the latch members to engage each other.

The saddle tee 12 can be installed on the irrigation line L with the passage 28 oriented generally vertically, so that the tap 14 can be inserted into the irrigation line. However, the saddle tee 12 of the present invention is adapted to be mounted on the irrigation line L with the passage extending generally horizontally. This allows the line to be buried shallower, and helps reduce the incidence of the saddle tee and tap projecting above the surface of the ground.

Figure 4:
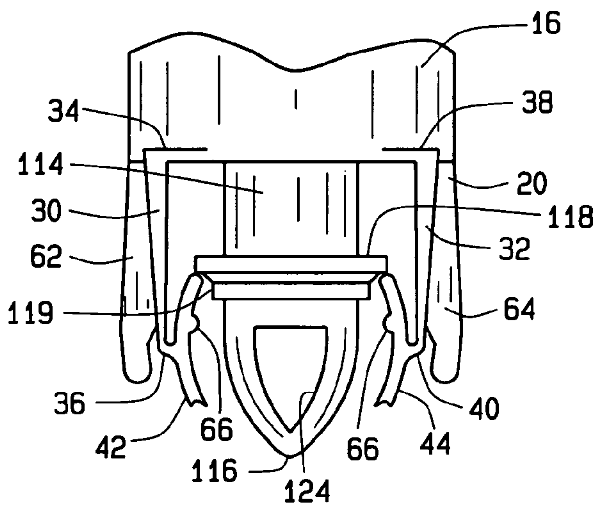
FIG. 4 is a partial side elevation view of the saddle tee shown with the tap extended.

The tap 14 is inserted into the irrigation line L by threading the threads 106 on the body 100 into the threads 26 in the passage 24. The wings 110 and 112 facilitate turning the tap 14. The point 116 on the tip 114 is advanced toward the irrigation line L. As shown in FIG. 7B, the tip 114 is advanced into engagement with the fluid line L so that the point 116 punctures the wall of the irrigation line, and the tip advances 116 until the flange 118 engages the outside of the wall of the irrigation line surrounding the puncture made by the point 116 of the tip 114. As shown in FIG. 4, the size of the flange 118 on the tip, and the size and position of the jaws 42 and 44 are preferably such that the flange 118 engages the ends 46 and 54 of the jaws, limiting the travel of the tap 14, and preventing the tip 116 from puncturing both sides of the irrigation line L.

The windows 124 of the tip 114 are disposed in the lumen of the irrigation line L, in fluid communication so that fluid in the line L can pass through the windows 124 and into the passage 120, to another irrigation line or to an irrigation device connected to the passage 120 with threads 126.

The saddle tee 12 holds the irrigation line L in proper alignment for connection with the tap 14. In the preferred embodiment, the saddle tee 12 also elongates the cross sectional profile of the irrigation line L in the direction in which the tap 14 pierces the line, to allow the tip of the tap to extend further into irrigation line, than would be possible if the irrigation line maintained its generally circular cross sectional profile. This also allows the saddle tee and tap to be used with irrigation lines of different sizes, the elongation of the smaller lines in particular preventing the tip 116 from puncturing both sides of the line.

The flange 118 helps compress the irrigation line, helping to retain in the irrigation line L in the clamp 28, and keeping the wall of the irrigation line even. The flange 118 also helps form a seal around the puncture formed by the tip 116. Thus a relatively larger clamp that is easier to secure around the irrigation line L can be used, and the tap 14, and particularly the flange 118 on the tip 114 of the tap 14, can help hold the irrigation line in the relatively looser clamp 28.

Thus, with the saddle tee and tip combination of the present invention, a connection can be quickly be made in an irrigation line at any point along its length. It is possible to make the connection without tools, although tools can be used to facilitate the connection process. The saddle tee and tap combination can allow a connection to be made in any orientation around the circumference of the line. By elongating the cross section of the irrigation line, the saddle tee and tap allow the tap to be inserted further into the irrigation line, making a more secure connection, and reducing the risk that the walls of the irrigation line will interfere with flow through the windows 124.

What is claimed is:

1. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp compressing the irrigation line to elongate the cross-sectional profile in a direction aligned with the passageway in the base, the clamp including first and second arms, a first jaw hingedly connected to the first arm; a second jaw hingedly connected to the second arm, and wherein the first jaw overlaps and engages the second jaw to close the clamp, the first jaw having first and second ends, and a generally arcuate configuration, with a concave inner surface for engaging a portion of an irrigation line, and the second jaw having first and second ends, and a generally arcuate configuration, with a concave inner surface for engaging a portion of an irrigation line, and one or more raised ridges on the inner surface of the first and second jaws to help prevent the irrigation line from twisting in the clamp.

2. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp compressing the irrigation line to elongate the cross-sectional profile in a direction aligned with the passageway in the base, the clamp including first and second arms, a first jaw hingedly connected to the first arm; a second jaw hingedly connected to the second arm, and wherein the first jaw overlaps and engages the second jaw to close the clamp, the jaws comprising one or more raised ridges on the inner surfaces of the first and second jaws to help prevent the irrigation line from twisting in the clamp;

the first jaw having first and second ends, and a generally arcuate configuration, with a concave inner surface for engaging a portion of an irrigation line, and the second jaw having first and second ends, and a generally arcuate configuration, with a concave inner surface for engaging a portion of an irrigation line, the thickness of the arms generally tapering from the proximal end adjacent the base to their distal end, the arms extending from the base far enough to allow the irrigation line to be spaced from the base, leaving the second end open to allow debris to pass through the passageway, and the jaws being hingedly mounted to their respective arms intermediate their ends such that the length of the jaw between the first end and the hinge connection is at least about one third of the distance between the arms.

3. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp comprising first and second arms extending from the base far enough to allow the irrigation line to be spaced from the base, leaving the second end open to allow debris to pass through the passageway, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the portion between the first end of each jaw and the hinged connection with its respective arm being at least about 0.4 inches, the first and second jaws comprising one or more raised ridges on the inner surface of the first and second jaws to help prevent the irrigation line from twisting in the clamp.

4. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, the first and second jaws comprising one or more raised ridges on the inner surface of the first and second jaws to help prevent the irrigation line from twisting in the clamp;

the second ends of the first and second jaws overlapping and engaging each other to close the clamp, the portion between the first end of each jaw and the hinged connection with its respective arm being at least about one third of the distance between the arms; the first jaw having an outwardly projecting tab, the second jaw having a shoulder; wherein the tab and shoulder can be engaged to draw the jaws toward each other.

5. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp compressing the irrigation line to elongate the cross-sectional profile in a direction aligned with the passageway in the base, the clamp including first and second arms, a first jaw hingedly connected to the first arm; a second jaw hingedly connected to the second arm, and wherein the first jaw overlaps and engages the second jaw to close the clamp, wherein the first jaw has first and second ends, and a generally arcuate configuration, with a concave inner surface for engaging a portion of an irrigation line, and the second jaw has first and second ends, and a generally arcuate configuration, with a concave inner surface for engaging a portion of an irrigation line, wherein the thickness of the arms generally tapers from the proximal end adjacent the base to their distal end, wherein the jaws are hingedly mounted to their respective arms intermediate their ends such that the length of the jaw between the first end and the hinge connection is at least about one third of the distance between the arms;

the saddle tee further comprising one or more raised ridges on the inner surface of the first and second jaws to help prevent the irrigation line from twisting in the clamp.

6. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the clamp self-closing around an irrigation line when the saddle tee is urged against the irrigation line with at least 30 pounds of force;

the saddle tee further comprising one or more raised ridges on the inner surface of the first and second jaws to help prevent the irrigation line from twisting in the clamp.

7. A saddle tee for use in making a fluid connection with an irrigation line in an irrigation system, the saddle tee comprising:

a base having first and second ends, and a passageway therebetween, and a clamp on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the portion between the first end of each jaw and the hinged connection with its respective arm being at least about 0.4 inches;

the saddle tee further comprising one or more raised ridges on the inner surface of the first and second jaws to help prevent the irrigation line from twisting in the clamp.

8. A saddle tee for use in making a fluid connection with an irrigation line in an irrigation system, the saddle tee comprising;

a base having first and second ends, and a passageway therebetween, and a clamp on the second end for engaging the irrigation line generally in alignment with the passageway through the base, the clamp comprising first and second arms extending from the base, a first jaw, having first and second ends, hingedly connected to the first arm intermediate the first and second ends; a second jaw, having first and second ends, hingedly connected to the second arm intermediate the first and second end, and wherein the second ends of the first and second jaws overlap and engage each other to close the clamp, the portion between the first end of each jaw and the hinged connection with its respective arm being at least about one third of the distance between the arms;

the saddle tee further comprising one or more raised ridges on the inner surface of the first and second jaws to help prevent the irrigation line from twisting in the clamp.

* * * * *